United States Patent
Sanders et al.

(10) Patent No.: US 12,422,867 B2
(45) Date of Patent: Sep. 23, 2025

(54) IRRIGATION MAINTENANCE SYSTEM

(71) Applicant: Heartland Ag Tech, Inc., Hancock, WI (US)

(72) Inventors: Russell Sanders, Minnetonka, MN (US); Jeremie Pavelski, Wisconsin Rapids, WI (US); Austin Ruzic, Wautoma, WI (US)

(73) Assignee: HEARTLAND AG TECH, INC., Hancock, WI (US)

( * ) Notice: Subject to any disclaimer, the term of this patent is extended or adjusted under 35 U.S.C. 154(b) by 111 days.

(21) Appl. No.: 18/101,754

(22) Filed: Jan. 26, 2023

(65) Prior Publication Data

US 2023/0176595 A1   Jun. 8, 2023

Related U.S. Application Data

(63) Continuation of application No. 17/693,622, filed on Mar. 14, 2022, now abandoned, which is a (Continued)

(51) Int. Cl.
*G05D 7/06* (2006.01)
*G05B 13/02* (2006.01)
(Continued)

(52) U.S. Cl.
CPC ......... *G05D 7/0676* (2013.01); *G05B 13/028* (2013.01); *G05B 19/042* (2013.01); *G05B 23/0283* (2013.01); *G05B 2219/2625* (2013.01)

(58) Field of Classification Search
CPC .......... G05B 13/028; G05B 19/042; G05B 23/0283; G05B 2219/2625; G05D 7/0676
See application file for complete search history.

(56) References Cited

U.S. PATENT DOCUMENTS 5,740,038 A    4/1998  Hergert
9,874,489 B1 *  1/2018  Jerphagnon ............. G01M 3/04
(Continued)

FOREIGN PATENT DOCUMENTS

CN        109661801 A      4/2019

OTHER PUBLICATIONS

Chinese Office Action for application No. 202180034682.6 dated Jul. 1, 2025 with English translation, 39 pages.

*Primary Examiner* — Christopher W Carter
(74) *Attorney, Agent, or Firm* — CARTER, DELUCA & FARRELL LLP

(57) ABSTRACT

An irrigation maintenance system for facilitating irrigation of a farming area includes a sensor disposed at a main disconnect of a utility, a processor, and a memory. The sensor is configured to generate a signal indicative of abnormal operation of at least one component of a plurality of components of an irrigation system for the farming area based on network power quality, the network power quality including a phase balance, an inrush current, a power factor, or combinations thereof. The memory includes instructions stored thereon, which when executed by the processor, cause the irrigation maintenance system to: determine abnormal operation of the at least one component of the irrigation system based on the signal; and predict, by a machine learning model, a maintenance requirement of the at least one component based on the determined abnormal operation.

21 Claims, 11 Drawing Sheets

Related U.S. Application Data continuation of application No. PCT/US2021/022842, filed on Mar. 17, 2021.

(60) Provisional application No. 63/002,930, filed on Mar. 31, 2020, provisional application No. 62/990,737, filed on Mar. 17, 2020.

(51) Int. Cl.
  *G05B 19/042* (2006.01)
  *G05B 23/02* (2006.01)

(56) References Cited

U.S. PATENT DOCUMENTS

| | | | |
|---|---|---|---|
| 10,721,881 B1* | 7/2020 | Fischman | G05B 13/024 |
| 2006/0027677 A1* | 2/2006 | Abts | A01G 25/092 |
| | | | 239/69 |
| 2011/0035059 A1* | 2/2011 | Ersavas | A01G 25/167 |
| | | | 455/466 |
| 2017/0218607 A1 | 8/2017 | Woods | |
| 2017/0349060 A1 | 12/2017 | Abts et al. | |
| 2018/0141069 A1 | 5/2018 | Lemkin | |
| 2018/0348714 A1* | 12/2018 | Larue | G05B 13/041 |
| 2019/0224511 A1 | 7/2019 | Cogswell et al. | |
| 2019/0239457 A1* | 8/2019 | Ricketts | A01G 25/16 |
| 2020/0383283 A1* | 12/2020 | Thatcher | G06Q 10/20 |
| 2021/0076579 A1* | 3/2021 | Thatcher | A01G 25/16 |

* cited by examiner

IRRIGATION MAINTENANCE SYSTEM

CROSS-REFERENCE TO RELATED APPLICATIONS

The present application is a continuation of U.S. patent application Ser. No. 17/693,622, filed on Mar. 14, 2022, which is a continuation of International Patent Application No. PCT/US2021/022842, filed Mar. 17, 2021, which claims the benefit of U.S. Provisional Patent Application No. 62/990,737, filed on Mar. 17, 2020, and U.S. Provisional Patent Application No. 63/002,930, filed on Mar. 31, 2020, the entire contents of each of which are hereby incorporated herein by reference.

TECHNICAL FIELD

This disclosure relates to irrigation systems and, more particularly, to structures and methods for effectuating predictive maintenance of irrigation systems.

BACKGROUND

Irrigation systems such as pivots, lateral move systems, drip irrigation systems, etc. breakdown on average three times per year out of 40 uses. These breakdowns occur during critical growing steps, and in many cases, in the middle of the field.

SUMMARY

To limit delays, increased costs and other problems associated with irrigation system breakdown, this disclosure details a solution including digital observation of the irrigation system during normal operation and set parameters that indicate abnormal operation. To observe these operational anomalies, sensors may be added to the irrigation system to provide data for algorithms to process. These algorithms may be logic or analytics based. Existing operational data from "off the shelf" may be used in some cases. In aspects, other data sources may be external to the system such as National Oceanic and Atmospheric Administration (NOAA) weather, topographical maps, soil moisture, etc., or combinations thereof.

According to one aspect of this disclosure, a predictive maintenance system for an irrigation system, includes an irrigation system configured to irrigate a farming area and includes a plurality of components, a sensor configured to generate a signal indicative of a condition of at least one component of the plurality of components of the irrigation system based on network power quality, a processor, and a memory. The sensor is disposed at a center pivot of the irrigation system or at a main disconnect of a utility. The memory includes instructions stored thereon, which when executed by the processor, cause the predictive maintenance system to receive the sensed signal, determine changes in the condition of the at least one component, and predict a maintenance requirement of the at least one component based on predetermined data. The network power quality includes a phase balance, an inrush current, a power factor, or combinations thereof.

In an aspect of the present disclosure, the sensor may include an encoder, pressure sensor, flow meter, a current sensor, a power sensor, a voltage sensor, or combinations thereof.

In another aspect of the present disclosure, the plurality of components of the irrigation system may include a pump, a pivot, a tower, an end tower, a corner tower, an air compressor, an endgun, or combinations thereof.

In yet another aspect of the present disclosure, the instructions, when executed by the processor, may further cause the predictive maintenance system to transmit an indication of the predicted maintenance requirement, to a user device for display, and display on a display of the user device, the indication of the predicted maintenance requirement.

In a further aspect of the present disclosure, the instructions, when executed by the processor, may further cause the predictive maintenance system to predict unexpected downtime of the at least one component based on predetermined data, and display on a display of a user device, the predict unexpected downtime of the at least one component.

In yet a further aspect of the present disclosure, determining changes in the condition of the at least one component may include comparing the sensed signal to predetermined data.

In an aspect of the present disclosure, the instructions, when executed by the processor, may further cause the predictive maintenance system to receive data from a weather station, a field soil moisture sensor, a terrain and soil map, a temperature sensor, National Oceanic and Atmospheric Administration weather, or combinations thereof.

In another aspect of the present disclosure, the instructions, when executed by the processor, may further cause the predictive maintenance system to refine the determined changes in the condition of the at least one component based on the received data and refine the prediction of the maintenance requirement of the at least one component based on the refined determined changes.

In yet another aspect of the present disclosure, the instructions, when executed by the processor, may further cause the predictive maintenance system to display on a display the refined prediction of the maintenance requirement.

In a further aspect of the present disclosure, the prediction may be based on comparing a power sensed by the sensor to an expected power based on at least one of a soil moisture directly measured, soil moisture inferred from weather data from the field and/or regional weather stations, a topographical map, a soil map, a motor RPM, a gearbox ratio, a tower weight, a span weight, an operating condition of the at least one component, or combinations thereof.

According to another aspect, a computer-implemented method for predictive maintenance for an irrigation system, includes receiving a signal, sensed by a sensor disposed at a center pivot of the irrigation system or at a main disconnect of a utility, indicative of a condition of at least one component of a plurality of components of an irrigation system based on network power quality, the irrigation system configured to irrigate a farming area and including a plurality of components, determining changes in the condition of the at least one component, and predicting a maintenance requirement of the at least one component based on predetermined data.

In yet a further aspect of the present disclosure, the sensor may include an encoder, pressure sensor, flow meter, a current sensor, a power sensor, a voltage sensor, or combinations thereof.

In an aspect of the present disclosure, the plurality of components of the irrigation system includes a pump, a pivot, a tower, an end tower, a corner tower, an air compressor, an endgun, or combinations thereof.

In another aspect of the present disclosure, the computer-implemented method may further include transmitting an indication of the predicted maintenance requirement, to a user device for display, and displaying on a display of the user device, the indication of the predicted maintenance requirement.

In another aspect of the present disclosure, the computer-implemented method may further include predicting unexpected downtime of the at least one component based on predetermined data, and displaying on a display of a user device, the predicted unexpected downtime of the at least one component.

In a further aspect of the present disclosure, determining changes in the condition of the at least one component may include comparing the sensed signal to predetermined data.

In yet a further aspect of the present disclosure, the computer-implemented method may further include receiving data from a weather station, a field soil moisture sensor, a terrain and soil map, a temperature sensor, National Oceanic and Atmospheric Administration weather, or combinations thereof.

In an aspect of the present disclosure, the computer-implemented method may further include refining the determined changes in the condition of the at least one component based on the received data, refining the prediction of the maintenance requirement of the at least one component based on the refined determined changes, and displaying on a display the refined prediction of the maintenance requirement.

In another aspect of the present disclosure, the prediction is based on comparing a power sensed by the sensor to an expected power based on at least one of a soil moisture directly measured, soil moisture inferred from weather data from the field and/or regional weather stations, a topographical map, a soil map, a motor RPM, a gearbox ratio, a tower weight, a span weight, an operating condition of the at least one component, or combinations thereof.

According to one aspect, this disclosure is directed to a non-transitory computer-readable medium storing instructions that, when executed by a processor, cause the processor to perform a computer-implemented method for predictive maintenance for an irrigation system. The computer-implemented method includes receiving a signal, sensed by a sensor, indicative of a condition of at least one component of a plurality of components of an irrigation system; determining changes in the condition of the at least one component; and predicting a maintenance requirement of the at least one component based on predetermined data. The irrigation system is configured to irrigate a farming area and includes the plurality of components.

According to one aspect, this disclosure is directed to a machine learning based predictive maintenance system that includes an irrigation system configured to irrigate a farming area, a plurality of components, a sensor disposed at a center pivot of the irrigation system or at a main disconnect of a utility. The sensor is configured to generate a signal indicative of a condition of at least one component of the plurality of components of the irrigation system. The system further includes a processor, and a memory. The memory includes instructions, which when executed by the processor, cause the predictive maintenance system to receive the sensed signal, determine abnormal operation of the at least one component, and predict, by a machine learning model, a maintenance requirement of the at least one component based the determined abnormal operation.

In yet another aspect of the present disclosure, the instructions, when executed by the processor, may cause the predictive maintenance system to display on a display the predicted maintenance requirement of the at least one component.

In a further aspect of the present disclosure, the plurality of components of the irrigation system includes a pump, a pivot, a tower, an end tower, a corner tower, an air compressor, an endgun, or combinations thereof.

In yet a further aspect of the present disclosure, the signal of abnormal operation may include an increase in energy required to move the irrigation system, a change in speed of the system, a changes in sequence of a moving of the tower, an endgun turn frequency, and/or a power quality metric.

In an aspect of the present disclosure, the power quality metric may include a phase balance, an inrush current, and/or a power factor.

In another aspect of the present disclosure, the sensor may include an encoder, pressure sensor, flow meter, a current sensor, a power sensor, a voltage sensor, or combinations thereof.

In yet another aspect of the present disclosure, the instructions, when executed by the processor, may further cause the predictive maintenance system to transmit an indication of the predicted maintenance requirement to a user device for display, and display, on a display of the user device, the indication of the predicted maintenance requirement.

In a further aspect of the present disclosure, the machine learning model is based on a deep learning network, a classical machine learning model, or combinations thereof.

In yet a further aspect of the present disclosure, the instructions, when executed by the processor, may further cause the predictive maintenance system to receive data from at least one of a weather station, a field soil moisture sensor, a terrain and soil map, a temperature sensor, National Oceanic and Atmospheric Administration weather, or combinations thereof.

In an aspect of the present disclosure, a prediction may be based on comparing a power sensed by the sensor to an expected power based on at least one of a soil moisture directly measured, soil moisture inferred from weather data from the field and/or regional weather stations, a topographical map, a soil map, a motor RPM, a gearbox ratio, a tower weight, a span weight, an operating condition of the at least one component, or combinations thereof.

According to one aspect, this disclosure is directed to a computer-implemented method for predictive maintenance for an irrigation system. The computer-implemented method includes receiving a signal, sensed by a sensor disposed at a center pivot of the irrigation system or at a main disconnect of a utility, which is indicative of a condition of at least one component of a plurality of components of an irrigation system based on network power quality. The irrigation system is configured to irrigate a farming area and includes a plurality of components. The computer-implemented method further includes determining abnormal operation of the at least one component and predicting, by a machine learning model, a maintenance requirement of the at least one component based the determined abnormal operation.

In another aspect of the present disclosure, the instructions, when executed by the processor, may further cause the predictive maintenance system to display on a display the predicted maintenance requirement of the at least one component.

In yet another aspect of the present disclosure, the plurality of components of the irrigation system may include a pump, a pivot, a tower, an end tower, a corner tower, an air compressor, an endgun, or combinations thereof.

In a further aspect of the present disclosure, the signal of abnormal operation includes an increase in energy required to move the irrigation system, a change in speed of the system, a change in sequence of a moving of the tower, an endgun turn frequency, a power quality metric, or combinations thereof.

In yet a further aspect of the present disclosure, the power quality metric may include a phase balance, an inrush current, a power factor, or combinations thereof.

In an aspect of the present disclosure, the sensor may include an encoder, pressure sensor, flow meter, a current sensor, a power sensor, a voltage sensor, or combinations thereof.

In another aspect of the present disclosure, the plurality of components of the irrigation system includes at least one of a pump, a pivot, a tower, an end tower, a corner tower, an air compressor, an endgun, or combinations thereof.

In yet another aspect of the present disclosure, the machine learning model is based on a deep learning network, a classical machine learning model, or combinations thereof.

In a further aspect of the present disclosure, the prediction is based on comparing a power sensed by the sensor to an expected power based on a soil moisture directly measured, soil moisture inferred from weather data from the field and/or regional weather stations, a topographical map, a soil map, a motor RPM, a gearbox ratio, a tower weight, a span weight, an operating condition of the at least one component, or combinations thereof.

According to one aspect, this disclosure is directed to a non-transitory computer-readable medium storing instructions that, when executed by a processor, cause the processor to perform a computer-implemented method for predictive maintenance for an irrigation system. The computer-implemented method includes receiving a signal, sensed by a sensor disposed at a center pivot of the irrigation system or at a main disconnect of a utility, indicative of a condition of at least one component of a plurality of components of an irrigation system based on network power quality, determining abnormal operation of the at least one component, and predicting, by a machine learning model, a maintenance requirement of the at least one component based on the determined abnormal operation. The irrigation system is configured to irrigate a farming area and includes a plurality of components.

Other aspects, features, and advantages will be apparent from the description, the drawings, and the claims that follow.

BRIEF DESCRIPTION OF DRAWINGS

The accompanying drawings, which are incorporated in and constitute a part of this specification, illustrate aspects of the disclosure and, together with a general description of the disclosure given above and the detailed description given below, explain the principles of this disclosure, wherein.

DETAILED DESCRIPTION

Figure 1:
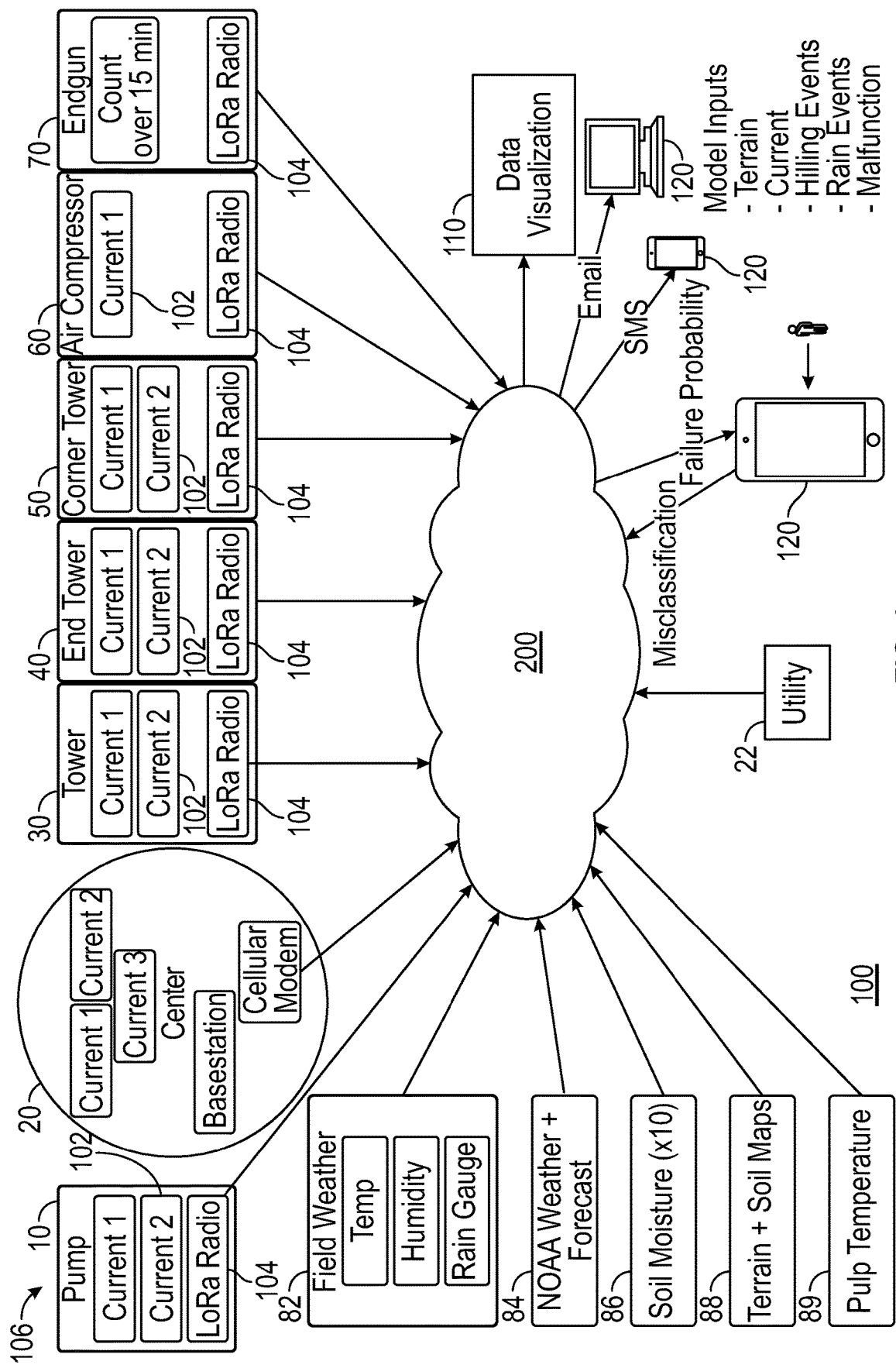
FIG. 1 is a diagram illustrating a predictive maintenance system.

Aspects of the disclosed predictive maintenance systems are described in detail with reference to the drawings, in which like reference numerals designate identical or corresponding elements in each of the several views. In addition, directional terms such as front, rear, upper, lower, top, bottom, and the like are used simply for convenience of description and are not intended to limit the disclosure attached hereto.

In the following description, well-known functions or constructions are not described in detail to avoid obscuring the present disclosure in unnecessary detail.

Today, for potato or vegetable farms, a simple watering timer is used, and if it is not reset on an approximately thirty-minute interval, the irrigation system infers there is a problem. There are also safety micro switches in each tower that open if a tower falls too far behind due to a drive system failure. At the control box, there may be an encoder that provides angular position or linear position in the case of a linear system. The encoder can also be used in connection with a drip irrigation system. There is also a voltage measurement at the controller and a circuit breaker that can be monitored. This disclosure augments these measurements to provide more data to algorithms to better predict the system health.

Advantageously, the disclosed system predicts common unexpected downtime versus notification that it occurred after the fact. The disclosed system provides better insight than a team driving around to observe operation which can be subjective. Technology today only notifies of failure after it occurred, whereas the disclosed system predicts the maintenance before it occurs.

Other diagnostic health measurements are after-the-fact, logic based, and do not attempt to assign a system health. This system predicts failure before it occurs like a check engine light for a car, or a digital twin for connected equipment. Further, while the disclosed system is described herein in connection with irrigation for a potato or vegetable farm, this system can be modified for any suitable farming operation requiring irrigation and can include drip irrigation systems, linear pivot systems, and/or center pivot systems.

With reference to FIGS. 1 and 7-9, a predictive maintenance system 100 is provided. Generally, the predictive maintenance system 100 includes an irrigation system 106 and a controller 200 configured to execute instructions controlling the operation of the predictive maintenance system 100. The irrigation system 106 may include a pump 10 (e.g., a compressor, see FIG. 11), a pivot 20, one or more towers 30, an end tower 40, a corner tower 50, an air compressor 60, and an endgun 70 (e.g., a movable nozzle, big gun, or movable gun which may be mounted on a pivot and/or an operably associated movable cart). The pump 10 may include one or more current sensors 102 and a wireless communication device 104 configured to transmit data wirelessly to the controller 200 (e.g., sensed current data). The pivot 20 may include one or more sensors 102 and a wireless communication device 104 configured to transmit data wirelessly to the controller 200. Each tower 30, corner tower 50, and end tower 40 may include one or more sensors 102 and a wireless communication device 104 configured to transmit data wirelessly to the controller 200. The wireless communication device may include, for example, 3G, LTE, 4G, 5G, Bluetooth, and/or Wi-Fi. The sensors 102 may include at least one of a current sensor, a voltage sensor, and/or a power sensor configured to sense, for example, current, voltage, and/or power, respectively.

In aspects, the one or more sensors 102 can include any suitable sensors such as, for example, an encoder (e.g., an angular encoder), pressure sensor, flow meter, etc., or combinations thereof. An angular encoder is a form of position sensor that measures the angular position of a rotating shaft.

In aspects, the one or more sensors may be connected (e.g., directly) and/or may be standalone components that may be connected via wide area network (WAN). In aspects, the one or more sensors may be aggregated in the cloud based on provisioning settings. In aspects, the one or more sensors may include, for example, low-power wide area network technology (LPWAN) which may be long-range (LoRa).

In aspects, the controller 200 may determine changes in the condition of the at least one component based on comparing the sensed signal to predetermined data.

The controller 200 is configured to receive data from the sensors 102 as well as from external data sources such as weather stations 82, field soil moisture sensors 86 terrain and soil maps 88, temperature sensors 89, and/or National Oceanic and Atmospheric Administration (NOAA) weather 84 to make and/or refine predictions indicative of a condition of at least one component (e.g., a pivot 20, an endgun 70, a tower 30, etc.) of the plurality of components of the irrigation system 106. This prediction enables the controller 200 to determine changes in the condition of the at least one component and predict maintenance requirements of the at least one component based on predetermined data (e.g., historical data). For example, the prediction may be based on comparing the determined changes in the condition of at least one component of the irrigation system 106 to predetermined data. For example, the sensor 102 of a tower 30 may sense the typical current draw of that tower 30. The sensed current draw may then be compared by the controller 200 to historical and/or typical tower current draw. The controller may determine that the sensed current draw of this tower 30 is considerably higher than the historical current draw by a predetermined number (e.g., about 30%) for a particular set of conditions (sunny day, dry soil, etc.). Based on this determination, the controller 200 may predict that this tower 30 needs maintenance. Additionally, the specific type of maintenance may be able to be predicted. For example, if the motor current of a tower 30 is high, it may indicate a flat tire. The system 100 may additionally predict the number of hours typically taken to repair such an occurrence. In another example, the system may sense, by the sensor 102 that the current on a pump 10 is low, and accordingly, predict that there is a pump 10 failure.

Data from the external data sources may be used to improve model predictions. For example, by processing data such as higher power use to motors of the towers 30 because the field is muddy due to recent rain, such processed data can be used to improve model predictions. The predictive maintenance system 100 may display field maps for terrain, soil types, etc. that help the model explain variation in power use. The predictions may be transmitted to a user device 120, by the controller 200, for display and/or further analysis.

In aspects, the data and/or predictions may be processed by a data visualization system 110. Data visualization is the graphical representation of information and data. By using visual elements like charts, graphs, and maps, data visualization tools provide an accessible way to see and understand trends, outliers, and patterns in data.

In aspects, the predictive maintenance system 100 may be implemented in the cloud. For instance, Linux, which may run a Python script, for example, can be utilized to effectuate prediction.

Figure 2:
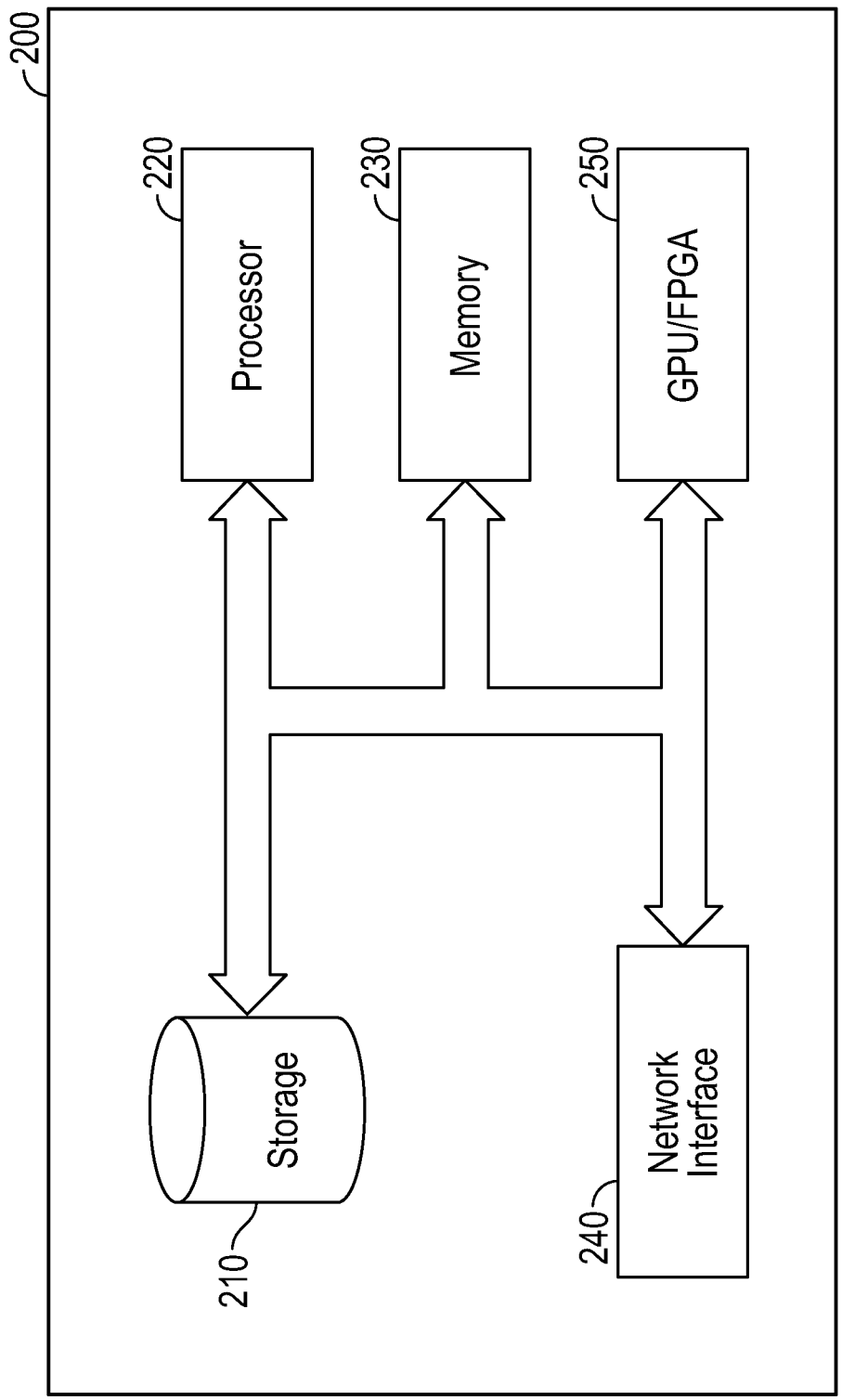
FIG. 2 is a block diagram of a controller configured for use with the predictive maintenance system of FIG. 1.

FIG. 2 illustrates that controller 200 includes a processor 220 connected to a computer-readable storage medium or a memory 230. The computer-readable storage medium or memory 230 may be a volatile type of memory, e.g., RAM, or a non-volatile type memory, e.g., flash media, disk media, etc. In various aspects of the disclosure, the processor 220 may be another type of processor such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

Figure 3:
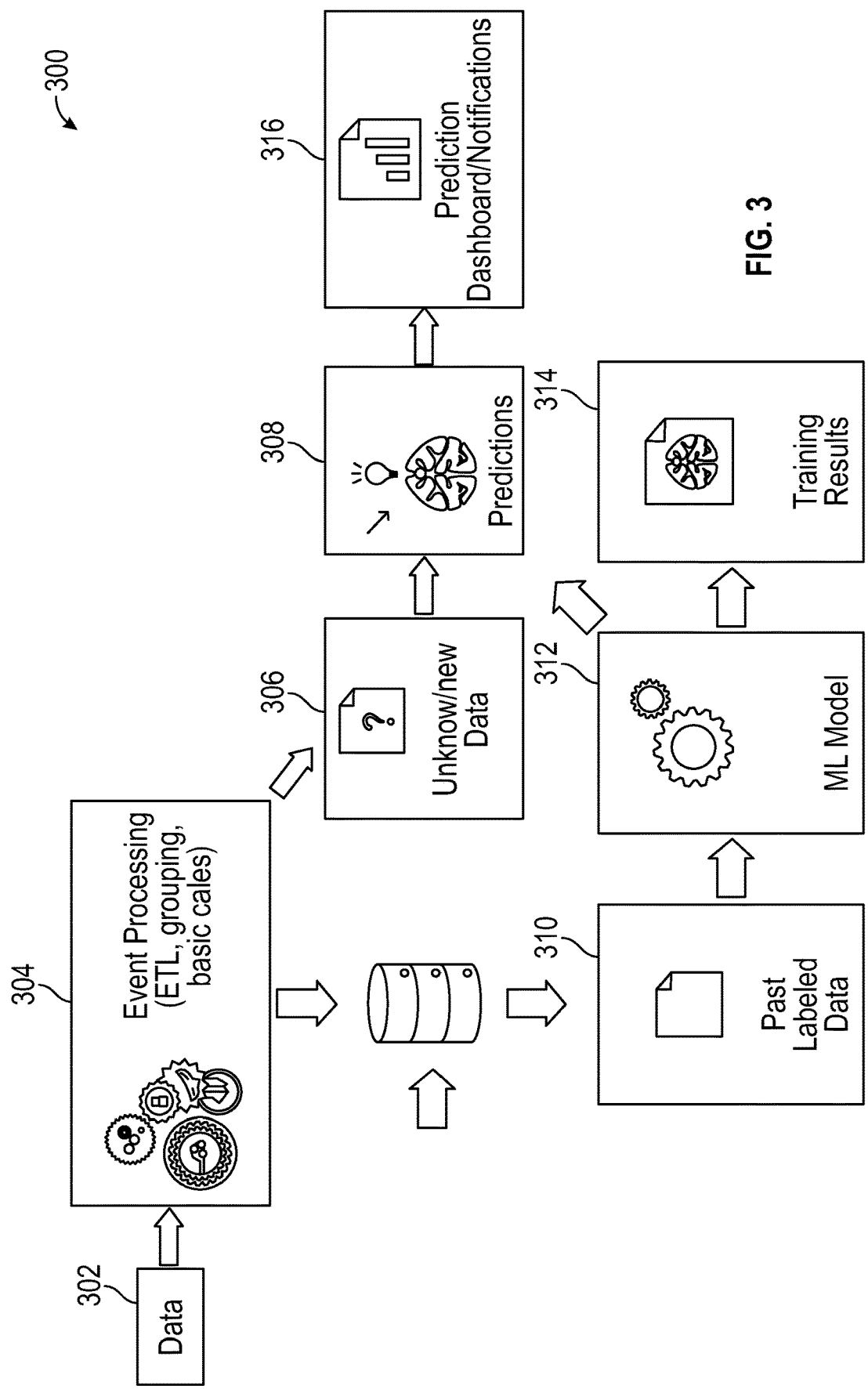
FIG. 3 is a diagram illustrating a machine learning model configured for use with the predictive maintenance system of FIG. 1.

FIG. 3 illustrates a basic machine learning model 300 and dataflow\storage\feedback of the pivot predictive maintenance system. The model 300 can be hosted at the pivot 20 or in the cloud (e.g., a remote server). The machine learning model 300 may include one or more convolutional neural networks (CNN).

In machine learning, a convolutional neural network (CNN) is a class of artificial neural network (ANN), most commonly applied to analyzing visual imagery. The convolutional aspect of a CNN relates to applying matrix processing operations to localized portions of an image, and the results of those operations (which can involve dozens of different parallel and serial calculations) are sets of many features that are used to train neural networks. A CNN typically includes convolution layers, activation function layers, and pooling (typically max pooling) layers to reduce dimensionality without losing too many features. Additional information may be included in the operations that generate these features. Providing unique information that yields features that give the neural networks information can be used to ultimately provide an aggregate way to differentiate between different data input to the neural networks. In aspects, the machine learning model 300 may include a combination of one or more deep learning networks (e.g., a CNN), and classical machine learning models (e.g., an SVM, a decision tree, etc.). For example, the machine learning model 300 may include two deep learning networks.

In aspects, two labeling methods for the training data may be used, one based on a connection with a computer maintenance system (CMMS) and one based on user input. In aspects, the user can be prompted to label data, or can provide the data manually (e.g., at a time of service events).

Figure 4A:
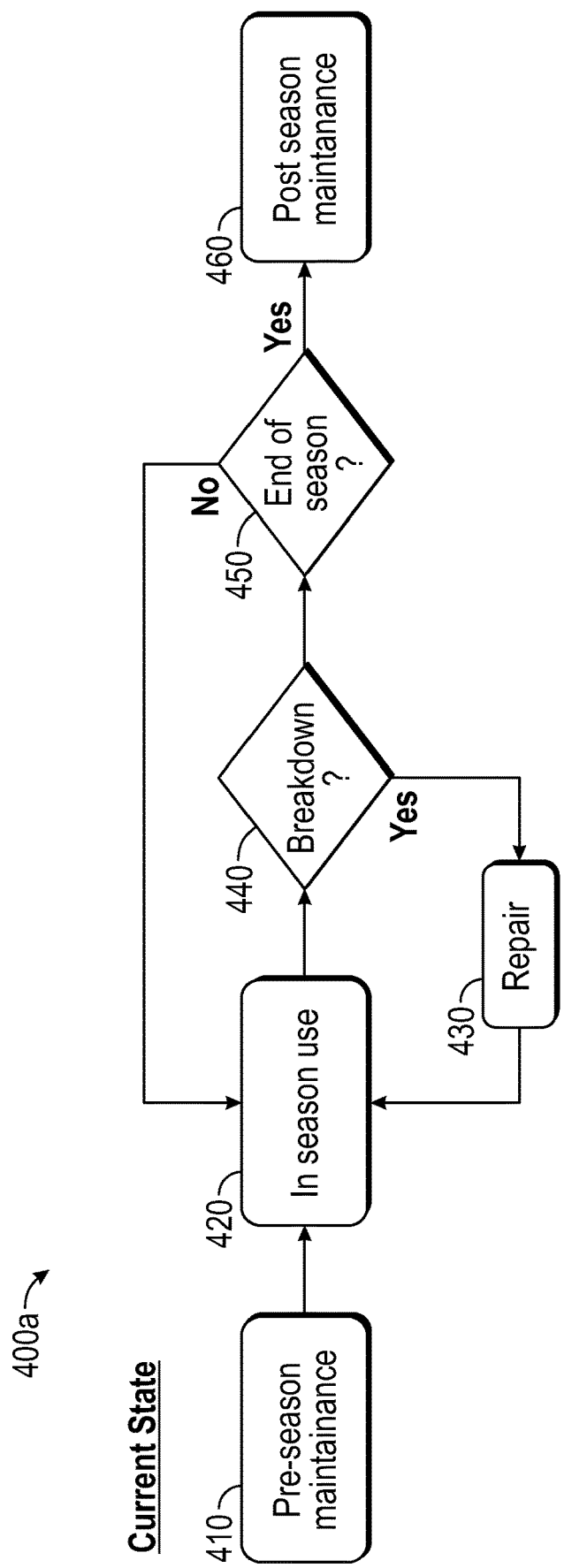
FIG. 4A illustrates an exemplary flow chart of a typical farm operation.

As noted above, FIG. 4A illustrates an exemplary flow chart of a typical farm operation 400a. Generally, at step 410, pre-season maintenance is performed on the irrigation equipment. Next, at step 420, the irrigation equipment is used in season. At step 440, if equipment is determined to have broken down, it is sent in for repair at step 430. At the end of the season (step 450), post-season maintenance is performed (step 460).

Figure 4B:
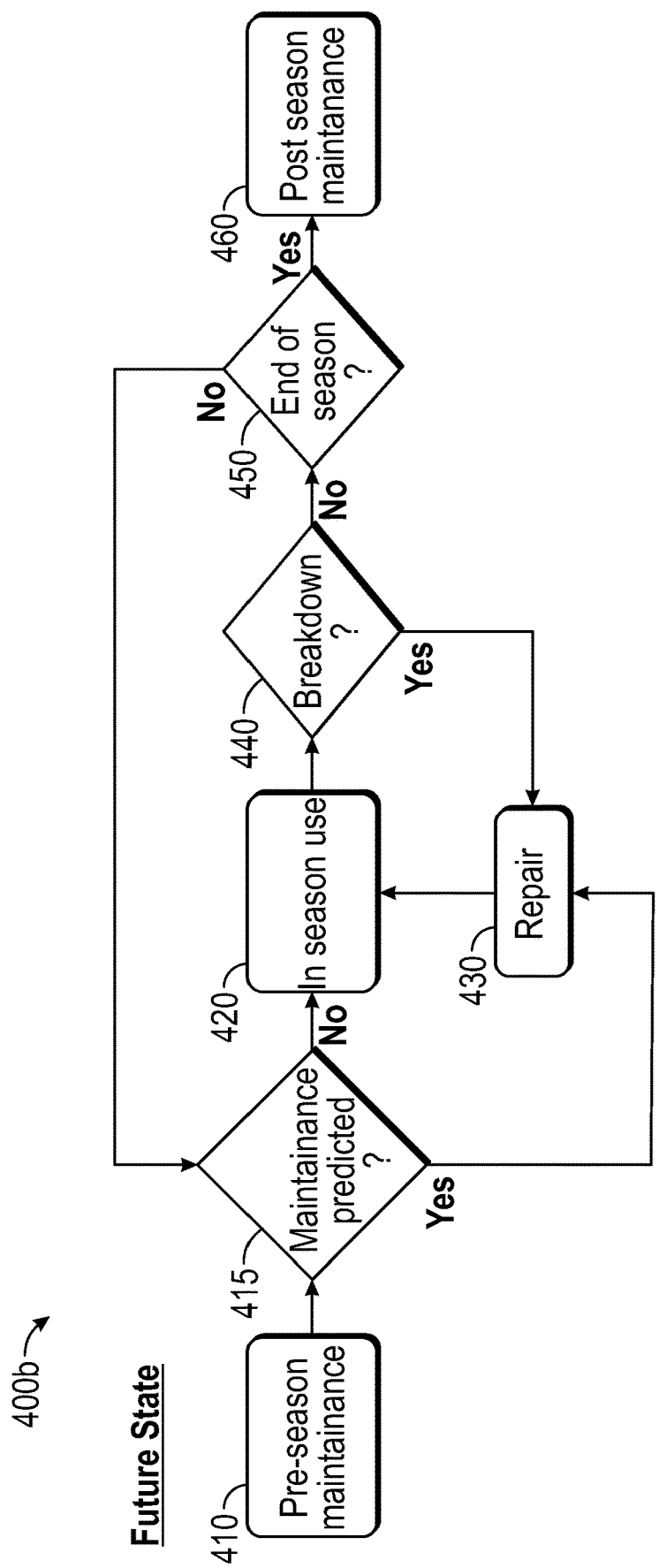
FIG. 4B illustrates an exemplary flow chart of a farm operation including a predictive maintenance system in accordance with the principles of this disclosure.

FIG. 4B illustrates an exemplary flow chart 400b of a farm operation including a pivot predictive maintenance system 100 in accordance with the principles of this disclosure. Generally, at step 410, pre-season maintenance is performed on the irrigation equipment. Next, the predictive maintenance system 100 predicts whether maintenance is needed for a particular piece of the irrigation equipment. If maintenance is predicted at step 415, then at step 430, the equipment is examined and repaired. Next, at step 420, the irrigation equipment is used in season. At step 440, if equipment is determined to have broken down, the equipment is sent in for repair at step 430. At the end of the season (step 450), post-season maintenance is performed (step 460).

Figure 5:
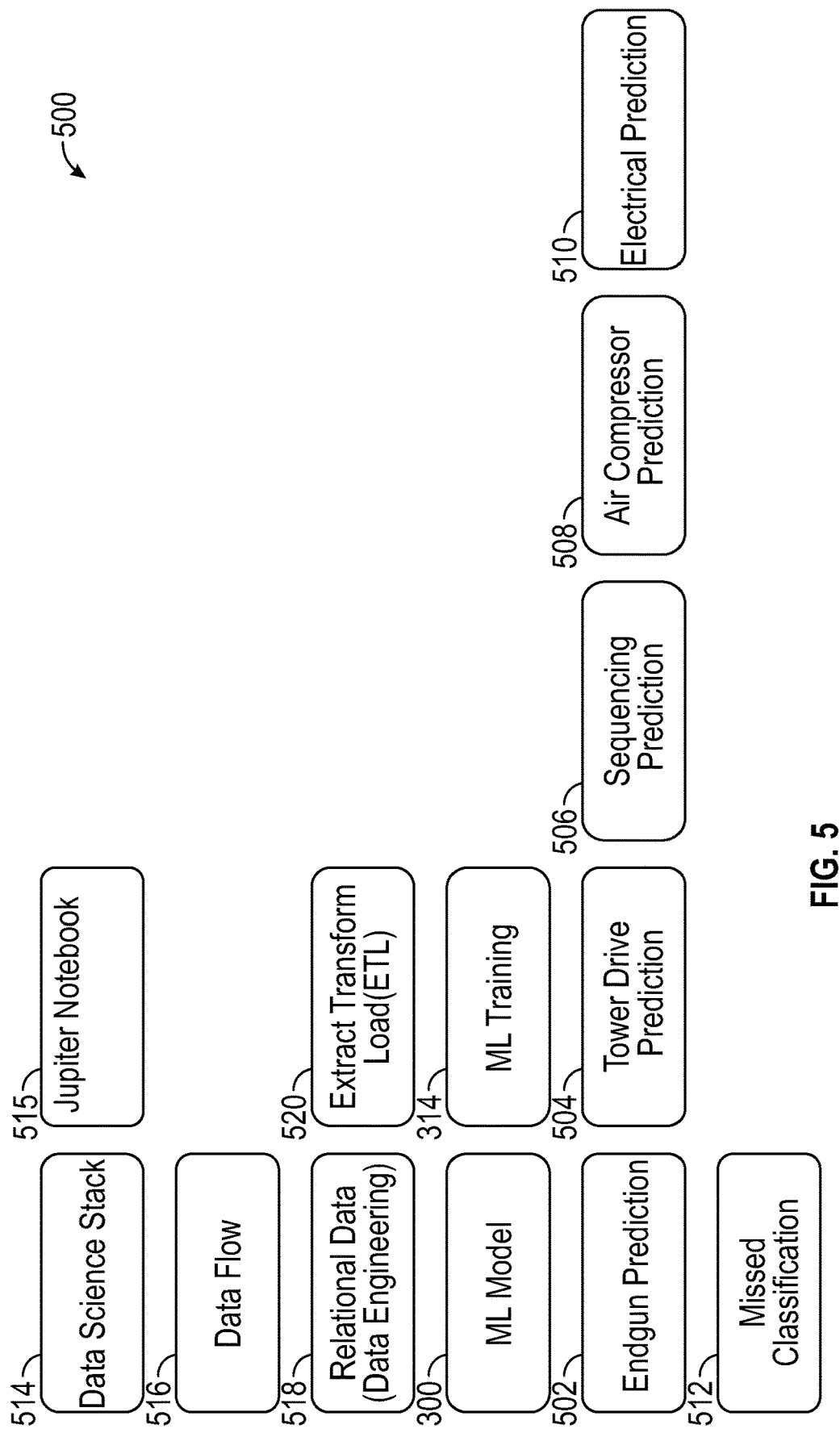
FIG. 5 illustrates a data science work-flow with various models of the predictive maintenance system illustrated in FIG. 1.
Figure 6:
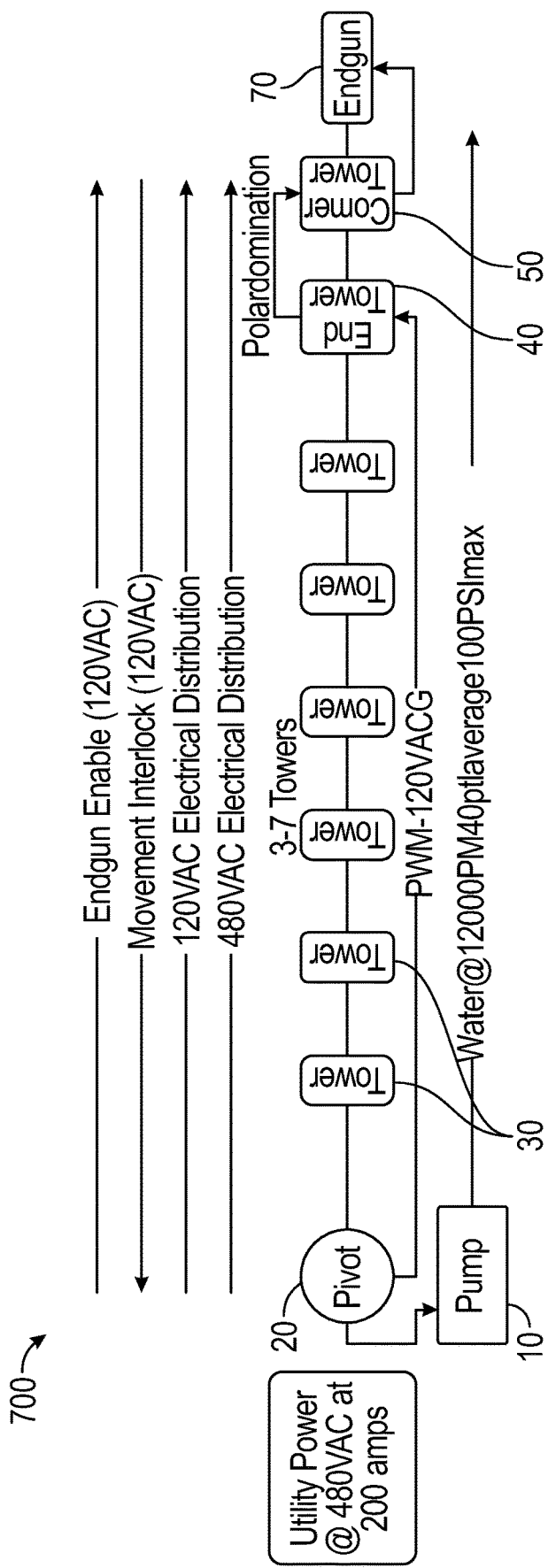
FIGS. 6-8 are diagrams of example hardware interface and instrumentation of the predictive maintenance system of FIG. 1.
Figure 7:
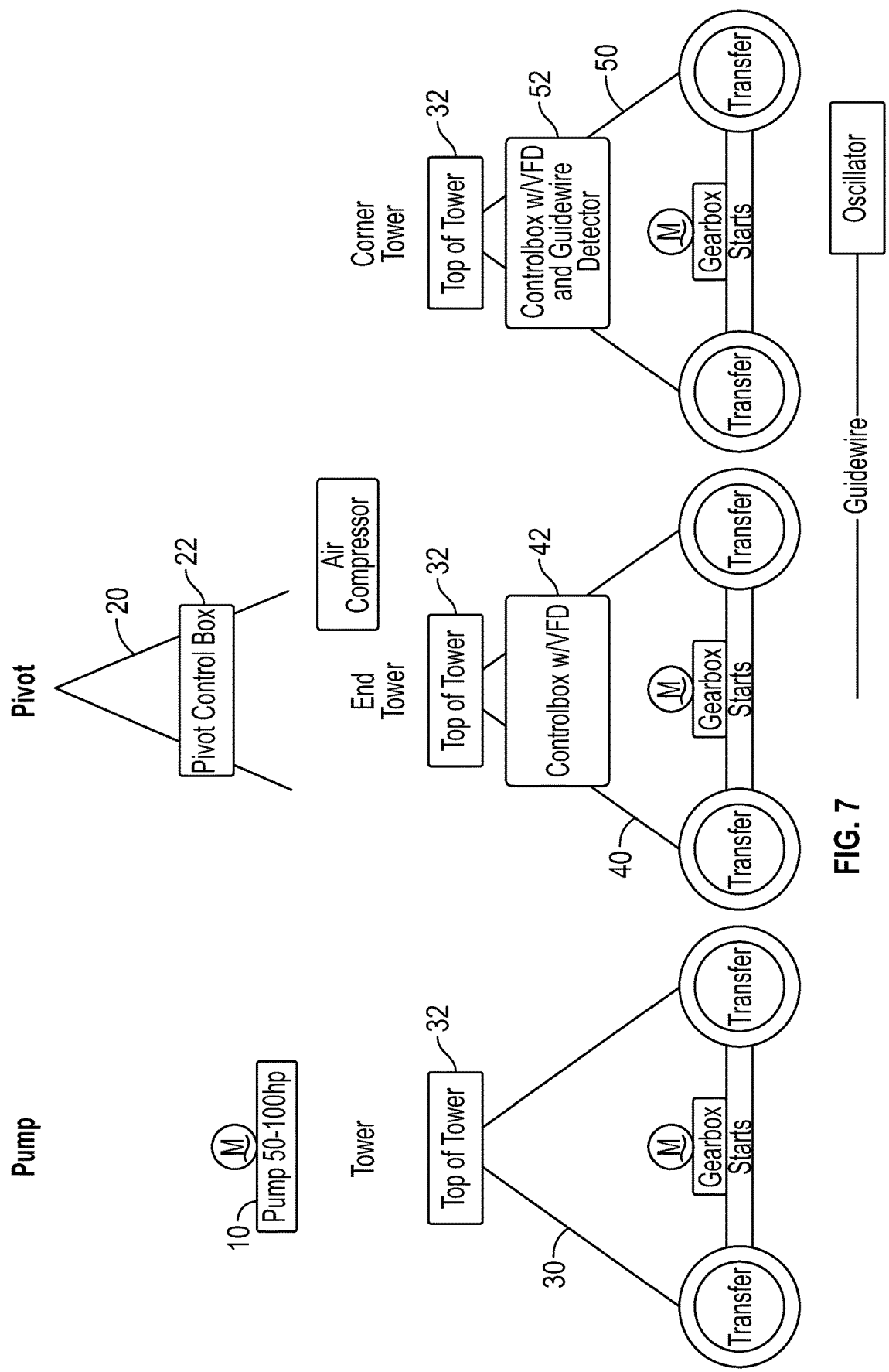
Figure 8:
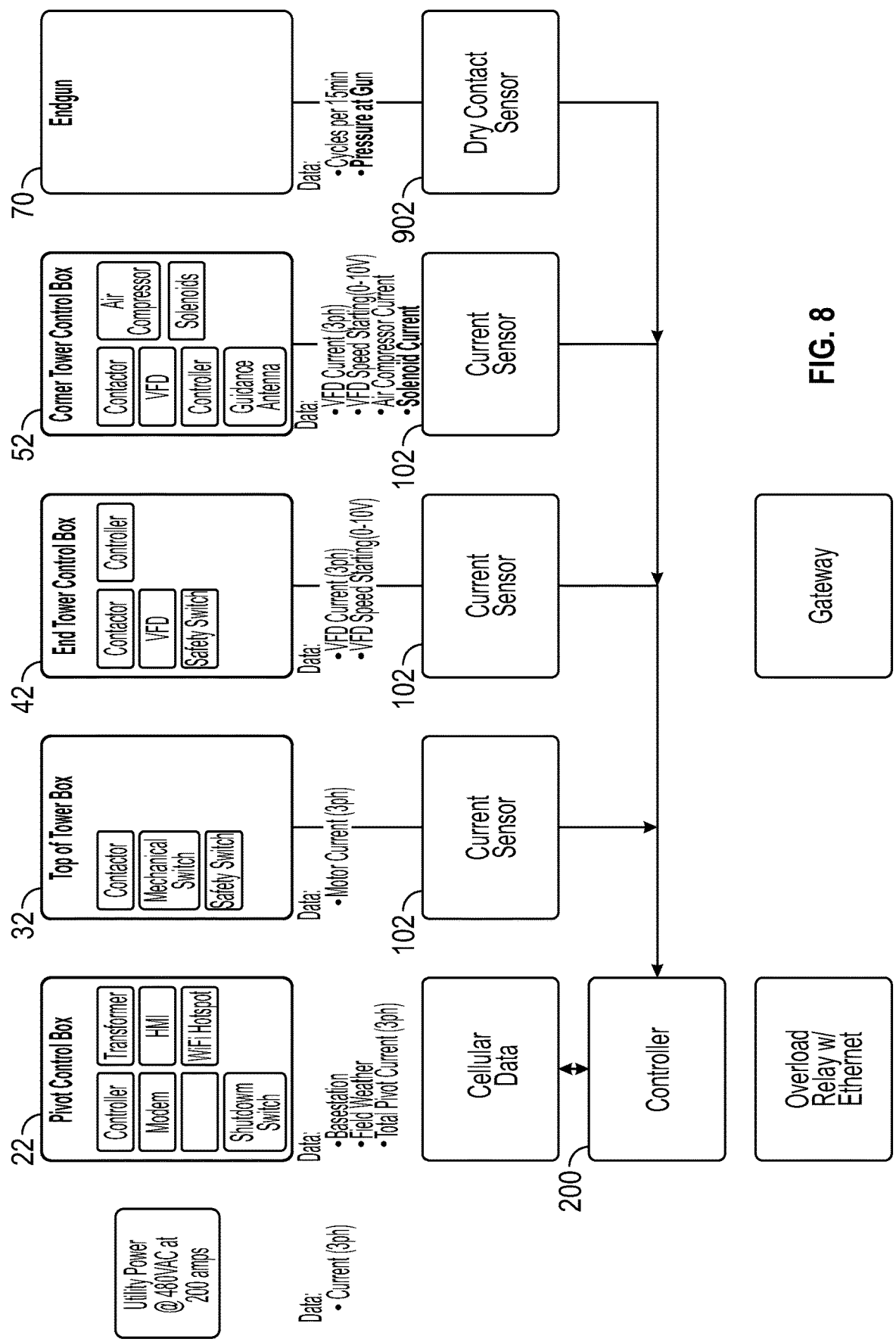
Figure 9:
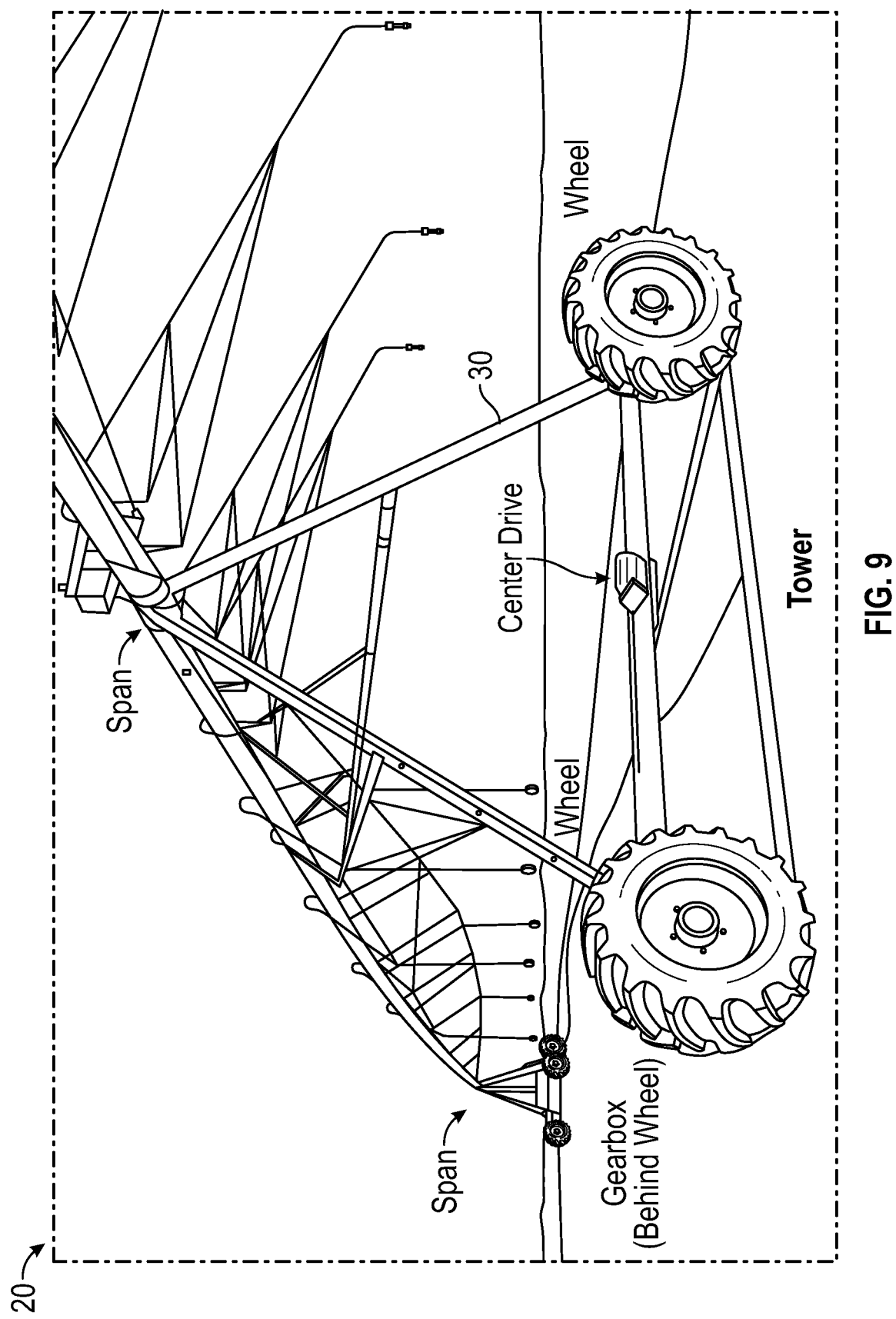
FIG. 9 is perspective view of a portion of an exemplary pivot of the predictive maintenance system of FIG. 1.
Figure 10:
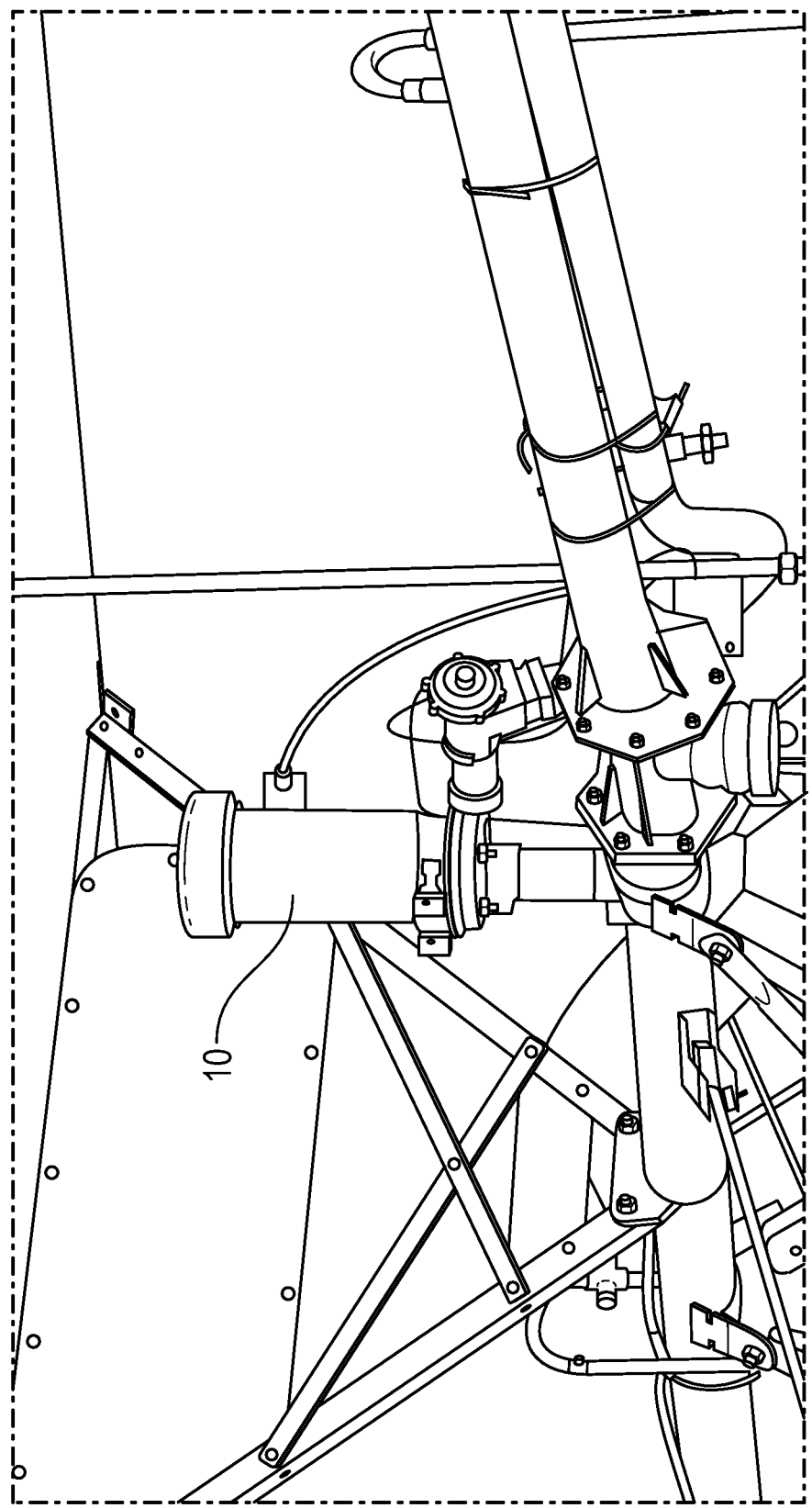
FIG. 10 is a perspective view of a portion of air compressor instrumentation of another exemplary pivot of the predictive maintenance system of FIG. 1.

FIG. 5 illustrates a data science work-flow with various models of the pivot predictive maintenance system illustrated in FIG. 4B.

The five models include an endgun prediction model 502, a tower drive prediction model 504, a sequencing prediction model 506, an air compression prediction model 508, and an electrical prediction model 510. The models may be implemented via logic and/or machine learning.

Endgun Prediction Model 502:

The endgun prediction model may count the number of times the endgun 70 (FIG. 1) takes to pass from left to right and back. Expected time to pass left and right may be based on pressure, bearing condition, tension, etc., or combinations thereof.

The endgun prediction model 502 can consider expected power based on soil moisture directly measured or inferred from weather data from the field or regional weather stations, topographical maps, soil maps, motor RPM, gearbox ratio, tower weight, span weight, operating condition, etc., or combinations thereof. The endgun 70 includes instrumentation which can measure each cycle using a proximity switch, encoder, capacitance, and/or image system. Aspects of the predictive maintenance system 100 can be mounted on or off the irrigation system 106, for example, a moisture sensor that logs when the moisture sensor is splashed remotely by the water being distributed to the field. If an electronic gun is used, energy use and duty cycle can be used.

Tower Drive Prediction Model 504 (See FIG. 9):

Measuring from center, the tower drive prediction model 504 may predict which tower is moving based on a power surge sequence. Measurements may, at each tower, motor, section, etc., and/or combinations thereof, provide more insight into individual tower 30, 40, 50 operation. Power can be measured with averaging current transformers, high bandwidth current transformers, VFD communications, smart contactors/breakers/relays, hall effect, etc., and/or combinations thereof.

Component temperature, such as contactor, motor, gearbox, can be monitored and compared to expected temperatures. Expected temperatures can be derived from speed, ambient temperature, component type, component combinations, position in the system, wire temperature, etc. and/or combinations thereof. A form of position sensing can be placed on each tower 30, 40, 50 and ground speed can be measured. Position sensing can include GPS, Ultra-Wideband, and/or RTK. Accelerometers may be used to measure grinding operation of gears of motor shaft bearings. Tire pressure sensors can directly measure the tire pressure. Angular sensors between the spans can be used to monitor relative position between towers. Tilt sensors can be used to measure tilt between the towers indicating one tire is low. An RPM sensor can be placed on each tire indicating a drive problem.

Sequencing Prediction Model 506:

Sequencing is staging in corner tower 50 water distribution. An example system has thirteen solenoid valves that open as the span expands into the corner tower 50 away from the end tower 40. When the corner tower 50 first begins to expand, one solenoid is opened to when such solenoid is fully extended, and all thirteen valves are opened. Solenoid valves typically fail, leading to excess watering when these solenoid valves do not close and underwatering when these solenoid valves do not open.

Monitoring pressure, flow, electrical current, electrical transient voltages, conductivity of a water circuit, nozzle status/state measurement, vision/infrared system to observe spray, nozzle temperature, vibration, etc., and/or combinations thereof can be utilized to provide insight into operation.

Air Compressor Prediction Model 508:

The air compressor prediction model 508 can monitor on/off state duty cycle, pressure, vibration, motor temperature and/or electrical power, which can provide insight into compressor health.

Monitoring output parameters such as endgun timing, flow, an/or pressure can also help infer air compressor health.

Condition of one or more components of the irrigation system may also be inferred from a power signal at the center pivot 20 (and/or at the main disconnect at the utility 22) without power sensors on the individual towers. This provides the advantage of using less sensors and a simpler setup in the field. In aspects, the controller 200 may monitor network power quality to a signal indicative of a condition of at least one component of the plurality of components of the irrigation system 106 (FIG. 1) based on power network analysis. Network power quality includes the degree to which a voltage, a current, a power, a frequency, and/or a waveform of a power supply system conform to a specification. Power network analysis may be performed by machine learning and/or by analytics. Power network analysis analyzes the network power quality over time to determine a condition of a component which is electrically connected to the network. The specification may be determined in advance based on analyzing historical network power data. For example, typically a tower 30 (FIG. 1) may use about 2 kW of power. In an irrigation system 106 with three towers running, the controller may expect to measure about 6 kW of power, as measured at the center pivot 20, being used at a specific time. However, if the controller 200 is measuring 7 kW, the controller 200 may determine that something is wrong with one of the towers 30 (e.g., a flat tire, causing a middle tower 30 to work harder to move causing an increase in power used by that tower 30). In aspects, a sensor 102 (e.g., a vibration sensor connected to each drive train of each tower 30) may be used to determine which tower 30 is on at what time, providing additional data to the controller 200.

Electrical Instrumentation:

The system may also monitor contactors, commutator rings, motor windings, electrical connections, and/or wiring failures. Monitoring electrical transients or power metrics such as THD, Power Factor, current balance can help infer electrical system health.

Monitoring component temperatures listed above can also help infer electrical system health.

Moreover, the disclosed structure can include any suitable mechanical, electrical, and/or chemical components for operating the disclosed pivot predictive maintenance system or components thereof. For instance, such electrical components can include, for example, any suitable electrical and/or electromechanical, and/or electrochemical circuitry, which may include or be coupled to one or more printed circuit boards. As used herein, the term "controller" includes "processor," "digital processing device" and like terms, and are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, Free-BSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud computing-based storage. In various aspects, the storage and/or memory device is a combination of devices such as those disclosed herein.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the surgical stapling apparatus, components thereof, and/or resources thereof. As used herein, the term "network" can include any network technology including, for instance, a cellular data network, a wired network, a fiber optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed surgical stapling apparatus or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but are not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The machine learning ("ML") model may be the most efficient for complex failures. However, basic logic can be used for simpler failure modes. Likely signals of abnormal operation may come from increases in energy required to move the irrigation system, changes in speed of the system, or changes in sequence of the towers moving, endgun turn frequency, or power quality metrics such as phase balance, inrush current, power factor, THD. Since these vary with a complex inference space, ML can assist in predicting abnormal operation and simplify user and subject matter expert input by giving a simple labeling method.

In aspects, the maintenance requirement may be predicted by generating, based on the received first set of sensor signals, a data structure that is formatted to be processed through one or more layers of a machine learning model. The data structure may have one or more fields structuring data. The maintenance requirement may further be predicted by processing data that includes the data structure, through each of the one or more layers of the machine learning model that has been trained to predict a likelihood that a particular piece of equipment may require maintenance; and generating, by an output layer of the machine learning model, an output data structure. The output data structure may include one or more fields structuring data indicating a likelihood that a particular piece of equipment may require maintenance. The maintenance requirement may further be predicted by processing the output data structure to determine whether data organized by the one or more fields of the output data structure satisfies a predetermined threshold, wherein the output data structure includes one or more fields structuring data indicating a likelihood that a particular piece of equipment may require maintenance; and generating the prediction based on the output data of the machine learning model. The prediction including the maintenance requirement.

It is contemplated that the machine learning network may be trained based on prior data including fault and no-fault conditions. In aspects, portions of the machine learning network may operate on the controller, or may operate on a remote system (e.g., a server and/or the cloud). Training may include supervised or non-supervised learning. In some aspects, a user can initiate a training session while watching operation to simplify setup on each unique end gun and pivot combination since pressures and flows may differ. When the end gun is deemed to be operating normally, the user can open a training window which will then be used to calibrate or train the machine learning model for future anomaly detection. The user interface enables the entry of meter data (e.g., from a delimited file) and/or base station data (e.g., from a second delimited file). The user interface may include the type of pivot (e.g., H62). The user interface may include controls to select a location (e.g., inner, middle, and/or end). The user interface may include controls to select the last number of observations, for example, the last 10, the last 100, the last 1000, etc. The system may predict a component failure (e.g., a tire failure) and/or a fault based on the data using a probability (e.g., 0.72). For example, if a middle location is selected and the last number of observations is set to "last 10", then based on the machine learning networks analysis of the meter data and base station data the user interface may provide an indication such as "probability of a middle fault 0.72." In another example, if an inner location is selected and the last number of observations is set to "last 10," then based on the machine learning networks analysis of the meter data and base station data, the user interface may provide an indication such as "probability of an inner fault 0.26."

As can be appreciated, securement of any of the components of the disclosed apparatus can be effectuated using known securement techniques such welding, crimping, gluing, fastening, etc.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An irrigation maintenance system comprising:
   an irrigation system configured to irrigate a farming area and including a plurality of components;
   a sensor disposed at a main disconnect of a utility, the sensor configured to generate, continuously and in real-time, a signal indicative of abnormal operation of at least one component of the plurality of components of the irrigation system based on network power quality, the network power quality including a phase balance, an inrush current, a power factor, or combinations thereof;

a processor; and a memory, including instructions stored thereon which, when executed by the processor, cause the irrigation maintenance system to:
  determine, continuously and in real-time, an abnormal operation of the at least one component based on the signal, wherein the signal of abnormal operation includes a change in an endgun turn frequency; and
  predict, continuously and in real-time, by a machine learning model, a maintenance requirement of the at least one component based on the determined abnormal operation.

2. The irrigation maintenance system of claim 1, wherein the instructions, when executed by the processor, cause the maintenance system to:
  display on a display the predicted maintenance requirement of the at least one component.

3. The irrigation maintenance system of claim 1, wherein the plurality of components of the irrigation system includes a pump, a pivot, a tower, an end tower, a corner tower, an air compressor, an endgun, or combinations thereof.

4. The irrigation maintenance system of claim 3, wherein the signal of abnormal operation further includes an increase in energy required to move the irrigation system, a change in speed of the system, a change in sequence of a moving of the tower, or combinations of the increase in energy required to move the irrigation system, the change in speed of the system, the change in sequence of the movement of the tower, or the change in the endgun turn frequency, wherein the sequence of the moving of the tower is a series of ordered operational states expected for normal function.

5. The irrigation maintenance system of claim 4, wherein the sensor includes a pressure sensor, a current sensor, a power sensor, a voltage sensor, or combinations thereof.

6. The irrigation maintenance system of claim 1, wherein the instructions, when executed by the processor, further cause the system to:
  transmit an indication of the predicted maintenance requirement to a user device for display.

7. The irrigation maintenance system of claim 6, wherein the instructions, when executed by the processor, further cause the system to:
  display, on a display of the user device, the indication of the predicted maintenance requirement.

8. The irrigation maintenance system of claim 1, wherein the machine learning model is based on a deep learning network, a classical machine learning model, or combinations thereof.

9. The irrigation maintenance system of claim 1, wherein the instructions, when executed by the processor, further cause the irrigation maintenance system to receive data from at least one of a weather station, a field soil moisture sensor, a terrain and soil map, a temperature sensor, or National Oceanic and Atmospheric Administration weather.

10. The irrigation maintenance system of claim 1, wherein the prediction is based on comparing a power sensed by the sensor to an expected power based on at least one of a soil moisture directly measured, a soil moisture inferred from weather data from the field and/or regional weather stations, a topographical map, a soil map, a motor RPM, a gearbox ratio, a tower weight, a span weight, an operating condition of the at least one component, or combinations thereof.

11. The irrigation maintenance system of claim 1, wherein the instructions, when executed by the processor, cause the irrigation maintenance system to:
  compare the signal to predetermined, expected values.

12. A computer-implemented method for irrigation maintenance of an irrigation system, the computer-implemented method comprising:
  receiving, continuously and in real-time, a signal, sensed by a sensor disposed at a center pivot of the irrigation system or at a main disconnect of a utility, indicative of a condition of at least one component of a plurality of components of the irrigation system based on network power quality, the network power quality including a phase balance, an inrush current, a power factor, or combinations thereof, the irrigation system configured to irrigate a farming area and including a plurality of components;
  determining, continuously and in real-time, an abnormal operation of the at least one component based on the signal, wherein the abnormal operation includes a change in an endgun turn frequency; and
  predicting, continuously and in real-time, by a machine learning model, a maintenance requirement of the at least one component based on the determined abnormal operation.

13. The computer-implemented method of claim 12, further comprising:
  displaying on a display the predicted maintenance requirement of the at least one component.

14. The computer-implemented method of claim 12, wherein the plurality of components of the irrigation system includes at least one of a pump, a pivot, a tower, an end tower, a corner tower, an air compressor, or an endgun.

15. The computer-implemented method of claim 14, wherein the signal indicating the abnormal operation includes at least one of an increase in energy required to move the irrigation system, a change in speed of the system a change in sequence of a moving of the tower, or combinations of the increase in energy required to move the irrigation system, the change in speed of the system, the change in sequence of the movement of the tower, or the change in the endgun turn frequency, wherein the sequence of the moving of the tower is a series of ordered operational states expected for normal function.

16. The computer-implemented method of claim 15, further comprising:
  transmitting an indication of the predicted maintenance requirement to a user device for display; and
  displaying, on a display of the user device, the indication of the predicted maintenance requirement.

17. The computer-implemented method of claim 12, wherein the sensor includes an encoder, a pressure sensor, a flow meter, a current sensor, a power sensor, a voltage sensor, or combinations thereof.

18. The computer-implemented method of claim 12, wherein the machine learning model is based on a deep learning network, a classical machine learning model, or combinations thereof.

19. The computer-implemented method of claim 12, wherein the prediction is based on comparing a power sensed by the sensor to an expected power based on at least one of a soil moisture directly measured, a soil moisture inferred from weather data from the field and/or regional weather stations, a topographical map, a soil map, a motor RPM, a gearbox ratio, a tower weight, a span weight, an operating condition of the at least one component, or combinations thereof.

20. An irrigation maintenance system for facilitating irrigation of a farming area, the irrigation maintenance system comprising:
- a sensor disposed at a main disconnect of a utility, the sensor configured to generate, continuously and in real-time, a signal indicative of abnormal operation of at least one component of a plurality of components of an irrigation system for the farming area based on network power quality, the network power quality including a phase balance, an inrush current, a power factor, or combinations thereof, and wherein the network power is three phase;
- a processor; and
- a memory, including instructions stored thereon which, when executed by the processor, cause the irrigation maintenance system to:
  - determine, continuously and in real-time, an abnormal operation of the at least one component of the irrigation system based on the signal, wherein the signal of abnormal operation includes a change in an endgun turn frequency; and
  - predict, continuously and in real-time, by a machine learning model, a maintenance requirement of the at least one component based on the determined abnormal operation.

21. The irrigation maintenance system of claim 20, wherein the plurality of components of the irrigation system includes at least one of a pump, a pivot, a tower, an end tower, a corner tower, an air compressor, or an endgun.

* * * * *